April 3, 1928.  1,665,122

W. H. WHITE

TRACTOR LIGHTING DEVICE

Filed June 25, 1927

William H. White
INVENTOR

BY Victor J. Evans
ATTORNEY

WITNESS:

Patented Apr. 3, 1928.

1,665,122

UNITED STATES PATENT OFFICE.

WILLIAM H. WHITE, OF COPELAND, KANSAS.

TRACTOR-LIGHTING DEVICE.

Application filed June 25, 1927. Serial No. 201,529.

This invention relates to means for attaching a magneto to a tractor in such a manner that it will be driven from the pulley shaft of the tractor so as to furnish current for a lighting system placed on the tractor or for other purposes.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1:
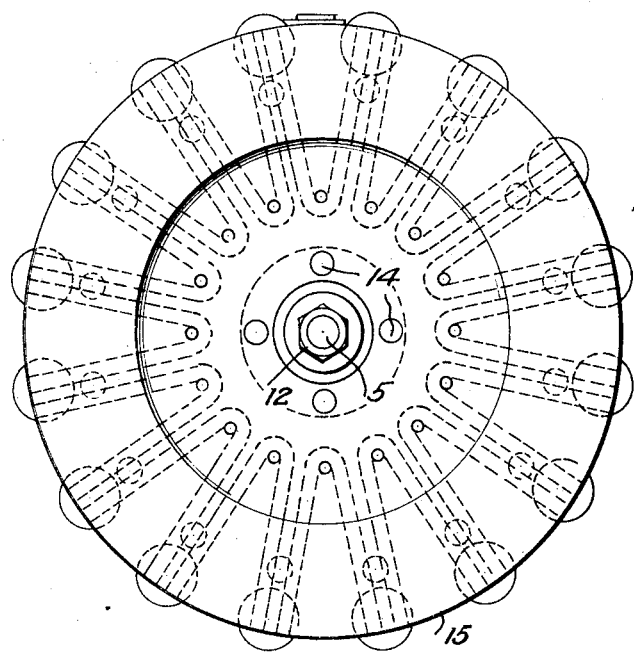
Figure 1 is a front view showing a magneto placed on the pulley shaft of a tractor.
Figure 2:
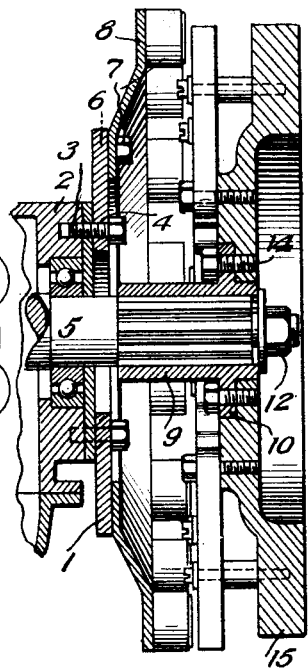
Figure 2 is a vertical sectional view through Figure 1.
Figure 3:
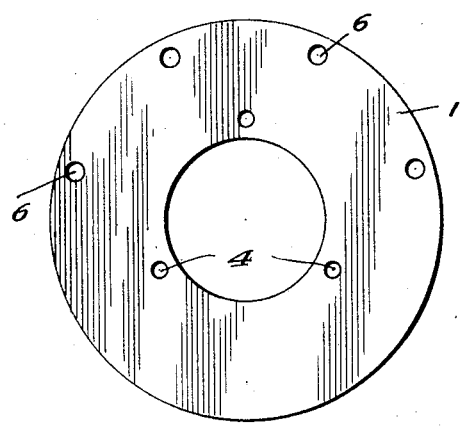
Figure 3 is a view of the supporting disk for the armature coil carrying member of the magneto.
Figure 4:
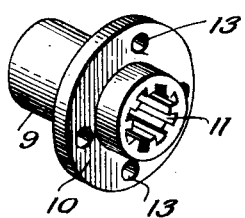
Figure 4 is a view of the hub member for fastening the fly wheel of the magneto to the pulley shaft.

In these views, 1 indicates a disk or ring-shaped plate which is adapted to be bolted to a part 2 of the engine block of the tractor by the bolts 3 which pass through the holes 4 formed adjacent the inner circumference of the plate. The plate is so situated that the shaft 5 which ordinarily carries a pulley passes through the hole formed in the plate. The top part of the plate is formed with the holes 6 to receive the bolts 7 which fasten the coil carrying member 8 of the magneto to said plate.

A hub 9 having a collar 10 connected therewith is splined, as shown at 11, so that it can be substituted for the pulley on the shaft 5 and after this hub is placed on the shaft, it is fastened in place by the nut 12 which is used to hold the pulley on said shaft. The collar 10 is provided with the holes 13 for receiving the bolts 14 which fasten the fly wheel 15 of the magneto to the hub.

The parts are so constructed that the fly wheel of the magneto, which is of the Ford type, is spaced the proper distance from the field coils, this distance being regulated by the long end of the hub. A wire, attached to the binding post at the top of the armature coil, will furnish current for a lamp on the tractor or for other purposes.

From the foregoing it will be seen that with this invention, the Ford type of magneto can be easily and quickly placed on a tractor so that it will be driven from the pulley shaft of the tractor so that a lamp carried by the tractor can be supplied with current. It will also be seen that the parts can be quickly removed when it is desired to replace the pulley on the shaft 5.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. Means for placing a magneto on the pulley shaft of a tractor, comprising a plate bolted to a part of the engine block of the tractor, means for fastening to the plate the coil carrying member of the magneto, a hub adapted to be substituted for the pulley on the shaft and means for attaching to the hub the fly wheel of the magneto.

2. In a tractor, a ring-shaped plate bolted to the engine block of the tractor and surrounding a part of the pulley shaft of the tractor, a hub splined to the shaft and taking the place of the pulley usually carried by said shaft, a collar on the hub, means permitting the fly wheel of a Ford type of magneto to be bolted to the collar and means for connecting the coil carrying member of the magneto to the plate.

In testimony whereof I affix my signature.

WILLIAM H. WHITE.